United States Patent
Zehner et al.

(10) Patent No.: US 9,576,398 B1
(45) Date of Patent: Feb. 21, 2017

(54) PIXELATED LIGHT SHUTTER MECHANISMS FOR IMPROVING CONTRAST BETWEEN COMPUTER-GENERATED IMAGES AND AN AMBIENT VISIBLE ENVIRONMENT

(71) Applicant: Amazon Technologies, Inc., Reno, NV (US)

(72) Inventors: Robert Waverly Zehner, Los Gatos, CA (US); Robert Nasry Hasbun, Fall City, WA (US)

(73) Assignee: Amazon Technologies, Inc., Reno, NV (US)

( * ) Notice: Subject to any disclaimer, the term of this patent is extended or adjusted under 35 U.S.C. 154(b) by 231 days.

(21) Appl. No.: 14/460,031

(22) Filed: Aug. 14, 2014

(51) Int. Cl.
*G06T 19/00* (2011.01)

(52) U.S. Cl.
CPC ......... *G06T 19/006* (2013.01); *G06T 2215/16* (2013.01)

(58) Field of Classification Search
None
See application file for complete search history.

(56) References Cited

U.S. PATENT DOCUMENTS

| 8,705,177 | B1* | 4/2014 | Miao | G09G 3/003 345/8 |
| 2005/0243023 | A1* | 11/2005 | Reddy | G09G 3/2011 345/48 |
| 2008/0158636 | A1* | 7/2008 | Hagood | G02B 6/0043 359/230 |
| 2008/0291120 | A1* | 11/2008 | Wu | G02B 7/002 345/8 |
| 2012/0176570 | A1* | 7/2012 | Yamazaki | G02F 1/1334 349/86 |

OTHER PUBLICATIONS

Bloom, David M. "Grating light valve: revolutionizing display technology." Electronic Imaging'97. International Society for Optics and Photonics, 1997.*

* cited by examiner

*Primary Examiner* — Kee M Tung
*Assistant Examiner* — Xin Sheng
(74) *Attorney, Agent, or Firm* — Sutherland Asbill & Brennan LLP

(57) ABSTRACT

Augmented reality systems and associated methods, computer-readable media, techniques, and methodologies for improving contrast between projected or emitted computer-generated images and ambient light of a visible real-world environment are disclosed. Devices that incorporate such augmented reality systems are also disclosed.

20 Claims, 8 Drawing Sheets

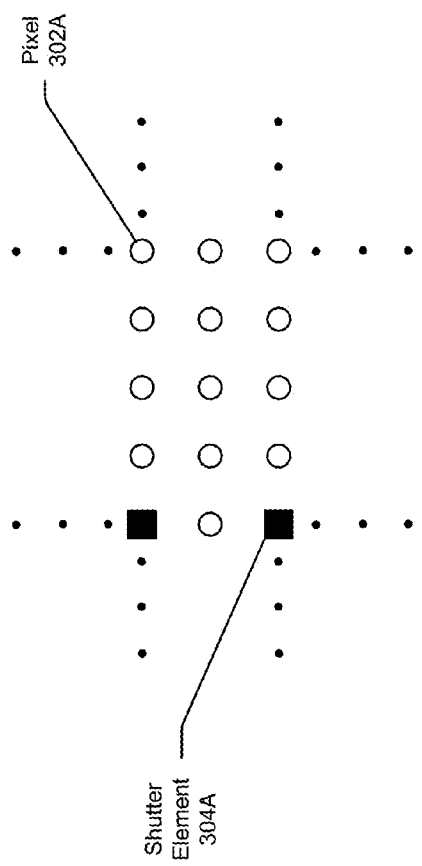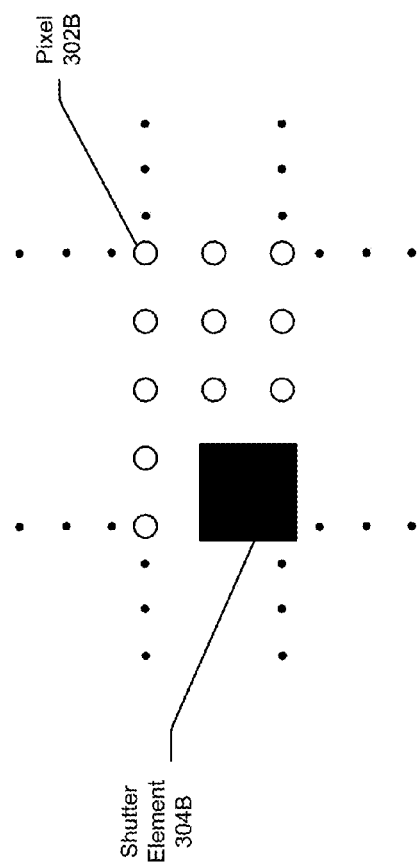

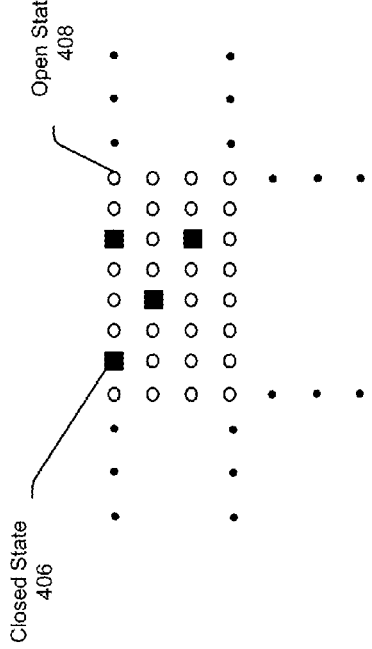
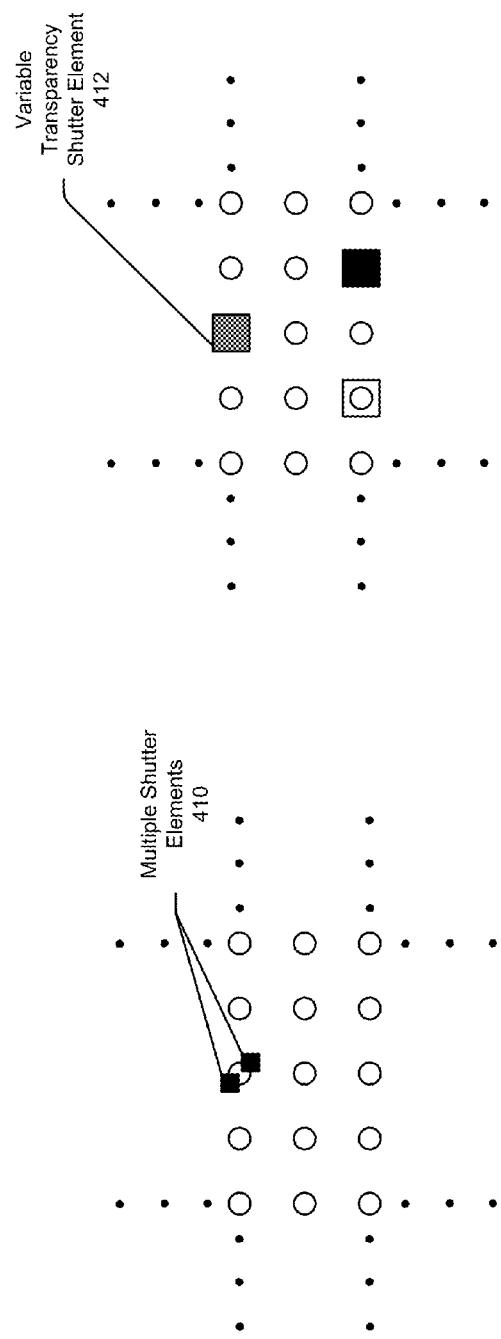
FIG. 4B
FIG. 4C
FIG. 4D

PIXELATED LIGHT SHUTTER MECHANISMS FOR IMPROVING CONTRAST BETWEEN COMPUTER-GENERATED IMAGES AND AN AMBIENT VISIBLE ENVIRONMENT

BACKGROUND

Near-eye displays may be broadly categorized into two types: virtual reality displays and augmented reality displays. A virtual reality near-eye system may include a wearable device (e.g., a head-mounted display) that includes display optics, such as lenses, that are opaque to ambient light from the environment. Certain virtual reality near-eye systems may include two displays (e.g., one for each eye of a user) that project respective computer-generated images that are sized and focused for viewing by both eyes of the user. Other virtual reality near-eye systems may include a single display that projects a single computer-generated image that is visible to both eyes.

An augmented reality near-eye system may include a wearable device with display optics that are substantially transparent to ambient light. Such display optics may include, for example, narrow-band reflectors, partial reflectors, holographic reflectors, or other display optics that operate to redirect projected light into a user's eye while permitting a substantial portion of ambient light to pass through as well. This produces the effect of having the projected image appear as an overlay on a real-world environment.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 3A-3B depict illustrative light shutter elements in accordance with one or more example embodiments of the disclosure.

FIGS. 4A-4D depict illustrative mechanisms for generating grayscale effects in accordance with one or more example embodiments of the disclosure.

DETAILED DESCRIPTION

Overview

Figure 1:
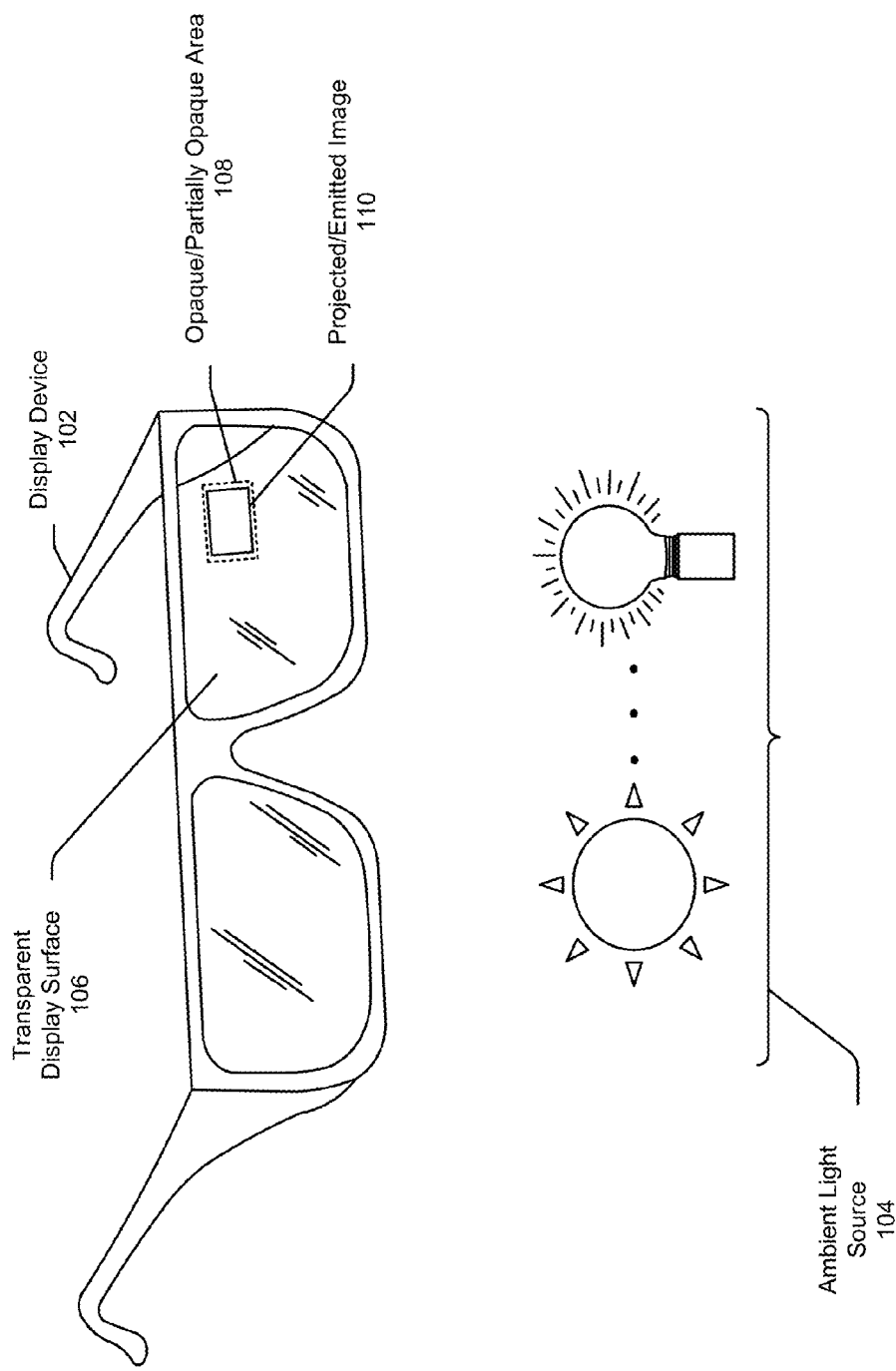
FIG. 1 depicts an example device in which an illustrative augmented reality system in accordance with one or more example embodiments of the disclosure may be implemented.

This disclosure relates to, among other things, augmented reality systems and associated methods, computer-readable media, techniques, and methodologies for improving contrast between projected or emitted computer-generated images and ambient light of a visible real-world environment. This disclosure further relates to devices that incorporate such augmented reality systems.

Augmented reality near-eye systems differ from virtual reality near-eye systems by providing display optics that are capable of displaying computer-generated images to a user while also being substantially transparent to incoming ambient light so as to allow the user to see and interact with a real-world visible environment. While it may be possible, through the use of cameras, to project real-world images onto display surfaces of a virtual reality near-eye system, such as virtual reality goggles, such a system has inherent drawbacks as compared to augmented reality near-eye systems. One such drawback is that battery power is required to generate the real-world camera images, and thus, if power runs out, complete opacity results.

A drawback of augmented reality near-eye systems is that light that forms the computer-generated images competes for brightness with incoming ambient light. For example, in the case of computer-generated text, the text should appear brighter or darker than the ambient surroundings in order to be visible to the user. The human eye perceives brightness approximately logarithmically over a moderate range of brightness levels. The human eye's perception of brightness more closely approximates a power law over a wider range of brightness levels. Thus, the brightness that a computer-generated image needs to have in order to exceed the brightness of the surroundings will increase multiplicatively with the brightness of the surroundings.

For example, in a 10-lux room, a 30-nit image may be visible. A lux is the International System of Units (SI) unit of luminous emittance, measures luminous flux per unit area, and is equivalent to one lumen/$m^2$. A nit is a measure of luminous intensity and is equivalent to one candela/$m^2$. One lumen is equivalent to one candela*steradian, where a steradian is the SI unit of a solid angle. In a much brighter ambient environment, such as an 80 k lux outdoor environment, a 240 k nit image would be needed to produce equal visibility of the image in relation to the ambient light. Since brightness scales roughly linearly with power, a significant amount of power would be needed to generate images that are visible in high-lux environments such as an outdoor environment.

Example embodiments of the disclosure include augmented reality systems that address this and other drawbacks by providing a light shutter that includes shutter elements that are selectively and independently controlled to modulate the amount of ambient light that reaches a user's eye. The shutter elements may be individually controllable by a computer processor between a closed state in which a corresponding portion of the ambient light is restricted or blocked from passing through the light shutter and an open state in which a corresponding portion of the ambient is allowed to pass through the light shutter.

The closed state of a shutter element may refer to a display state that is substantially opaque to incident light and the open state may refer to a display state that is substantially transmissive to incident light. Depending on the type of light shutter, the open and closed states of a shutter element may be achieved in any of a variety of ways. For example, in the case of a micro-electro-mechanical system (MEMS) shutter array, each shutter element may be a blocker (e.g., a thin flap of polysilicon) that can be physically and/or electronically actuated to move into or out of a plane of the shutter to either block ambient light from passing through a corresponding aperture or to allow ambient light to pass through the corresponding aperture. As another example, in the case of a shutter-mode electrophoretic display, charged particles contained within a microcapsule may be caused to migrate, via application of an electric field, between opposing surfaces of the microcapsule to transition the microcapsule from a substantially opaque state to a light-transmissive state.

While example types of light shutters are described above, it should be appreciated that the light shutter may employ any suitable mechanism for producing electro-optic effects to modulate the transmission of light. Other example types of light shutters that may be used in connection with augmented reality systems disclosed herein include, without limitation, a monochrome matrix twisted nematic liquid crystal display (LCD), an array of electrowetting pixel elements, a pixelated electrochromic element, and so forth. A pixelated electrochromic element may include an electrochromic material positioned between transparent electrodes. A color (or state) of the electrochromic material may be altered (e.g., between a transparent state and an opaque state) by varying an amount of voltage (or current) applied to the material.

An augmented reality system in accordance with an example embodiment of the disclosure may include a computer processor for generating image signals corresponding to a computer-generated image to be displayed. The image signals may be, for example, voltage signals, current signals, or the like. The augmented reality system may also include a light source that emits light, one or more imaging elements that receive the image signals via electronic circuitry and that modulate the emitted light based on the image signals to generate modulated light, and one or more optical elements that modify one or more transmission characteristics of the modulated light to produce projected light. The projected light may then be reflected off of a display surface such that the reflected light is directed into a user's eye. The light source and the imaging elements described above may form part of any suitable non-emissive display such as, for example, a backlit liquid crystal display (LCD). For example, the light source may include one or more light emitting diode (LED) backlights and the imaging elements may include an LCD display panel. In other example embodiments, the light source and imaging elements may be an organic light emitting diode (OLED) display that includes electroluminescent layer(s) that emit light when supplied with a current. In certain example embodiments, one or more of the light source, the electronic circuitry, the imaging element(s), and/or the optical element(s) may be described herein as a "projector" that projects light onto a display surface.

An augmented reality system in accordance with another example embodiment of the disclosure may include a computer processor for generating image signals corresponding to a computer-generated image to be displayed. The image signals may be, for example, voltage signals, current signals, or the like. The augmented reality system may also include a light source that receives the image signals via electronic circuitry and that emits light based on the image signals. The intensity of the emitted light may be proportional to an intensity of the image signals (e.g., an amount of current). The emitted light may then be passed through a display surface (or reflected off of the display surface) such that the light is directed into a user's eye. The light source (and optionally the electronic circuitry) may form part of any suitable emissive display such as, for example, an OLED display.

An augmented reality system in accordance with one or more embodiments of the disclosure, such as one that incorporates an emissive display or a non-emissive display, may include a light shutter having multiple shutter elements that are independently controllable by a computer processor of the augmented reality system to modulate an amount of ambient light that passes through the light shutter. The light shutter may be positioned in relation to the display surface such that ambient light that passes through a particular portion of the light shutter reaches a corresponding portion of the display surface and is transmitted through the display surface to a user's eye. For example, the light shutter may be coaxially positioned with respect to the display surface. More specifically, in certain example embodiments, the light shutter may be positioned adjacent to a side of the display surface that receives ambient light which, in turn, opposes a side of the display surface that reflects projected light corresponding to a computer-generated image or from which light corresponding to the computer-generated image is emitted.

In certain example embodiments, the computer processor may control one or more shutter elements to at least partially restrict the amount of ambient light that passes through corresponding portions of the light shutter and that reaches corresponding portions of the display surface displaying at least a portion of a computer-generated image. For example, the computer processor may generate signals that cause the one or more shutter elements to transition to a closed state that is substantially opaque to the ambient light. The computer processor may also control one or more other shutter elements to allow the ambient light to pass through corresponding portions of the light shutter and reach corresponding portions of the display surface such that the ambient light is transmitted through those portions of the display surface to the user's eye.

In certain example embodiments, the computer processor may also selectively control one or more shutter elements to at least partially restrict the amount of ambient light that passes through the light shutter and that reaches one or more portions of the display surface that are not displaying the computer-generated image, but which are adjacent to an area of the display surface which is displaying the computer-generated image. In certain example embodiments, the one or more portions of the display surface that are not displaying the computer-generated image and through which ambient light transmission is restricted may substantially surround or encompass the area of the display surface that is displaying the image. A boundary of these one or more portions of the display surface may be slightly larger than a boundary of the area of the display surface displaying the computer-generated image so as to produce a "local dimming" effect that provides increased contrast between the computer-generated image and a portion of the ambient environment immediately adjacent to the computer-generated image without compromising the visibility of other portions of the ambient environment.

In certain example embodiments, a shutter element of the light shutter may modulate the amount of ambient light that passes through a single pixel corresponding to the shutter element. In other example embodiments, a shutter element of the light shutter may modulate the amount of ambient light that passes through multiple corresponding pixels. In still other example embodiments, multiple shutter elements may collectively modulate an amount of ambient light that passes through a single corresponding pixel.

In addition, in those example embodiments in which the light shutter includes shutter elements that transition between closed states in which ambient light is substantially blocked (thereby producing black pixels) and open states in which ambient light is substantially allowed to pass through (thereby producing white pixels), a grayscale effect may be produced in various ways. For example, a grayscale effect may be achieved may maintaining or transitioning certain shutter elements to a closed state and maintaining or transitioning certain other shutter elements to an open state. As another example, a grayscale effect may additionally or alternatively be achieved using a time division multiplexing technique in which one or more shutter elements are transitioned between the closed state and the open state at one or more time intervals. The grayscale level may be modulated by controlling the amount of time the shutter elements remain in the closed state versus the open state. As yet another example, a grayscale effect may be achieved by adjusting various shutter elements to different levels of transparency (or opacity) to ambient light.

Further, in certain example embodiments, an ambient light sensor, image sensor (e.g., camera), or the like may be provided as part of the augmented reality system. The sensor may detect an intensity of ambient light passing through various portions of the light shutter and/or the display surface. The computer processor may programmatically control the shutter elements of the light shutter based on sensor data indicating ambient light intensity to modulate the amount of ambient light that passes through the light shutter and that reaches the display surface. For example, the computer processor may determine that ambient light of a particularly high intensity (e.g., intensity above a threshold value) is being transmitted through a particular portion of the display surface, and may control one or more shutter elements to restrict the amount of ambient light that passes through a portion of the light shutter that corresponds to the particular portion of the display surface. In this manner, particularly high intensities of ambient light may be diminished, thereby improving visibility of the computer-generated image and the overall user experience.

In certain example embodiments, a light shutter in accordance with example embodiments of the disclosure may exhibit high transmission in the open state such that the amount of ambient light passed through the light shutter and transmitted through the display surface is sufficient in low-light conditions. The light shutter may further exhibit a high extinction coefficient in the closed state so as to be substantially opaque to ambient light. In addition, in certain example embodiments, transmission characteristics of the light shutter may be unaffected by the polarization of the light. Light shutters that utilize polarizers may result in loss of ambient light. Thus, in certain example embodiments, a light shutter that allows light of all polarizations to pass through may be used. In certain other example embodiments, however, incoming ambient light may be polarized by, for example, an optical filter (e.g., a polarizing beam splitter) or the like provided as part of the light shutter. More specifically, ambient light of a particular polarity may be permitted to pass through the light shutter, while ambient light of other polarities may be prevented from passing through. The polarity of the ambient light that is permitted to pass through the light shutter may differ from the polarity of light forming a computer-generated image that is displayed on a display surface.

FIG. 1 depicts an example device 102 in which an illustrative augmented reality system in accordance with one or more example embodiments of the disclosure may be implemented. The display device 102 is illustratively depicted as a wearable device; however, it should be appreciated that augmented reality systems in accordance with example embodiments of the disclosure may be implemented in connection with any suitable device having any suitable display surface (e.g., an appliance having a transparent display via which an internal area of the appliance is visible, a windshield of an automobile, a window of a building, etc.).

The device 102 may include a transparent display surface 106 that reflects projected light corresponding to an image 110 into a viewer's eye or that allows emitted light corresponding to the image 110 to pass through to the viewer's eye. The transparent display surface 106 may be least partially transparent to ambient light so as to provide the appearance that the image 110 is overlaid on the visible ambient environment.

In certain example embodiments, a light shutter (not shown) may include shutter elements that are independently controllable to modulate the amount of ambient light that passes through the light shutter to reach the display surface 106. Certain shutter elements may be in a closed state such that ambient light is at least partially restricted from passing through a portion of the light shutter to reach a corresponding portion of the display surface 106. An example portion of the display surface 106 that does not receive ambient light is represented in FIG. 1 as the opaque/partially opaque area 108. In certain example embodiments, the opaque area 108 may at least partially surround the image 110 to provide a "local dimming" effect as described above.

Example embodiments of the disclosure provide a number of advantages or technical effects. For example, augmented reality systems in accordance with example embodiments of the disclosure provide improved contrast between a projected or emitted computer-generated image and an ambient environment through independent control of shutter elements of a light shutter to selectively modulate the amount of ambient that passes through corresponding portions of the light shutter to reach corresponding portions of a display surface. Further, in certain example embodiments, ambient light may be prevented from reaching portions of the display surface adjacent to an area displaying a computer-generated image, thereby providing a "local dimming" effect without compromising the visibility of the ambient environment. In addition, in certain example embodiments of the disclosure, high intensity ambient light may be detected at a particular portion of the display surface, and one or more shutter elements of a light shutter may be controlled to restrict the amount of ambient light reaching that particular portion of the display surface. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative System Configurations

Figure 2:
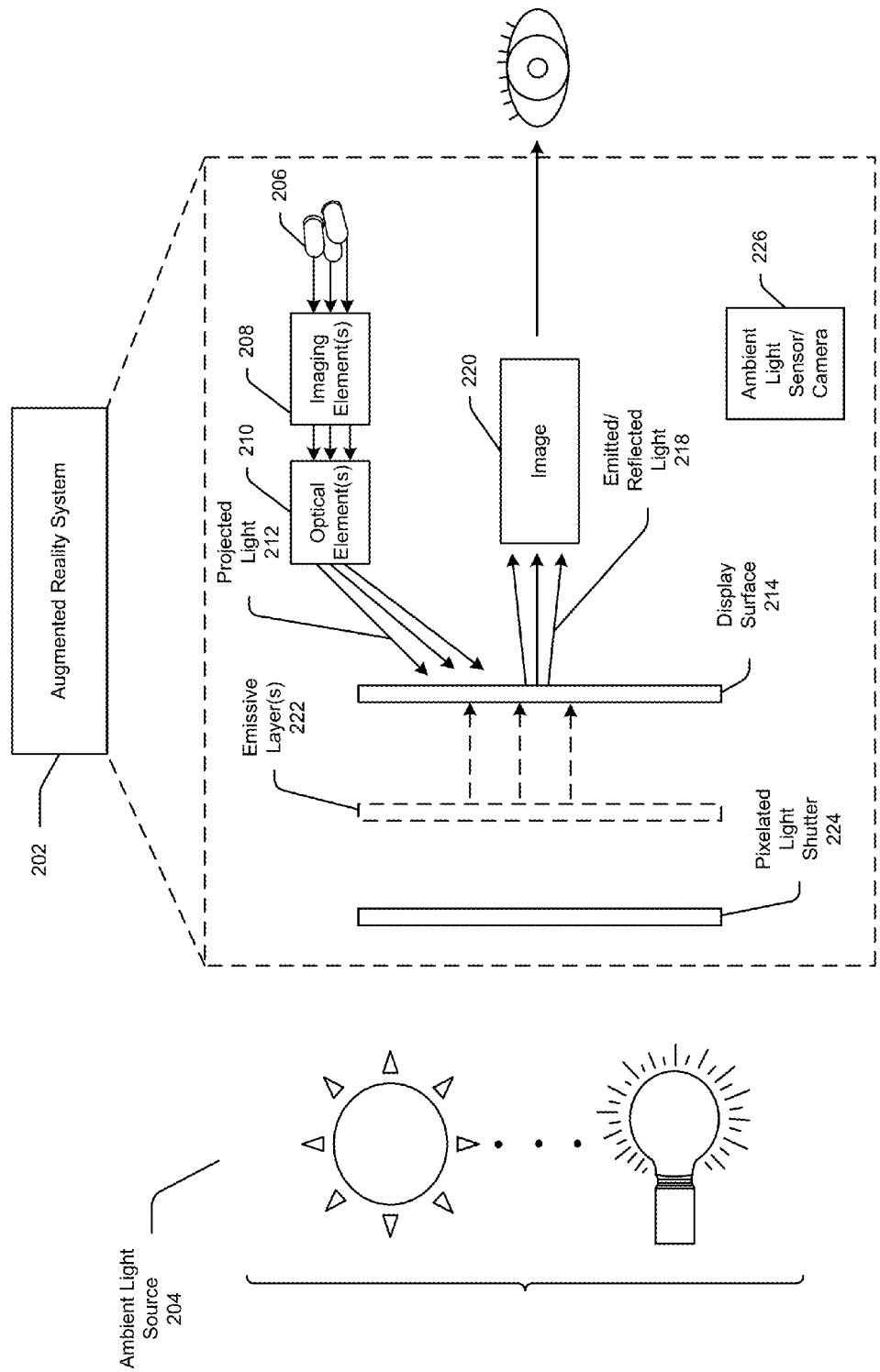
FIG. 2 is a schematic diagram of an illustrative augmented reality system in accordance with one or more example embodiments of the disclosure.

FIG. 2 is a schematic diagram of an illustrative augmented reality system 202 in accordance with one or more example embodiments of the disclosure. In certain example embodiments, the system 202 may include a computer processor (not shown) for generating image signals corresponding to a computer-generated image 220 to be displayed. The image signals may be, for example, voltage signals, current signals, or the like. The system 202 may also include a light source 206 that emits light, one or more imaging elements 208 that receive the image signals via electronic circuitry and that modulate the emitted light based on the image signals to generate modulated light, and one or more optical elements 210 that modify one or more transmission characteristics of the modulated light to produce projected light 212. The projected light 212 may then be reflected off of a display surface 214 such that the reflected light 218 representing the image 220 is directed into a user's eye.

In certain example embodiments, the light source 206 and the imaging elements 208 may form part of a non-emissive display such as, for example, a backlit liquid crystal display (LCD). Example LCD displays include, without limitation, thin-film-transistor (TFT) LCDs, active-matrix LCDs, passive-matrix LCDs, twisted nematic LCDs, in-plane switching LCDs, and so forth. The light source 206 may be any suitable light source such as, for example, a cold cathode fluorescence lamp (CCFL), a white light emitting diode (LED), an RGB LED, or the like. The imaging elements may include, for example, one or more pixel elements such as LCD pixels, where each LCD pixel may include a layer of liquid crystal molecules aligned between two transparent electrodes and two polarizing filters having axes of transmission that are perpendicular to each other. It should be appreciated that the examples for the light source 206 and the imaging elements 208 discussed above are merely illustrative and not exhaustive.

In certain other example embodiments of the disclosure, the system 202 may incorporate an emissive display as opposed to (or in addition to) a non-emissive display. For example, the system 202 may include one or more emissive layers 222 that operate as a light source by emitting light in response to receipt of image signals. In those example embodiments in which the system 202 incorporates an emissive display, the system 202 may similarly include a computer processor for generating image signals corresponding to the computer-generated image 220 to be displayed. The image signals may be, for example, voltage signals, current signals, or the like. The emissive layer(s) 222 may receive the image signals via electronic circuitry (not shown) and emit light based on the image signals. The intensity of the emitted light may be proportional to an intensity of the image signals (e.g., an amount of current). The emitted light may then be passed through the display surface 214 (or reflected off of the display surface 214 depending on the position of the emissive display relative to the display surface 214) such that the emitted light 218 representing the image 220 is directed into a user's eye.

The emissive display may include any suitable display such as, an OLED display, an electrochemical display (ECD), a plasma display panel (PDP), an LED display, an electroluminescent display (ELD), a vacuum fluorescent display (VFD), a surface-conduction electronic-emitter display (SED), a field emission display (FED, a cathode ray tube (CRT), or the like. In those example embodiments in which the emissive display is an OLED display, the display may be a top-emitting or bottom-emitting OLED display.

An OLED display in accordance with one or more example embodiments of the disclosure may include a substrate having an anode disposed thereon, a conductive layer deposited on the anode, one or more emissive layers 222 deposited on the conductive layer, and a cathode disposed on the one or more emissive layers 222. When an image signal is provided to the OLED display (e.g., an electrical current is supplied), the electrical current flows from the cathode to the anode causing the anode to remove electrons from the conductive layer (which is the equivalent to movement of electron holes to the conductive layer). Electrons in the emissive layer(s) 222 then occupy electron holes at an interface between the two layers, causing the electrons to release energy in the form of light photons emitted by the emissive layer(s) 222. While an OLED display has been described in some detail above, it should be appreciated that any suitable emissive display may be used.

The system 200, whether it incorporates an emissive display or a non-emissive display, may include a light shutter 224. The light shutter 224 may be a pixelated light shutter having multiple shutter elements (not shown) that are independently controllable by a computer processor of the system 202 to modulate an amount of ambient light that passes through the light shutter 224. The ambient light may be generated by an ambient light source 204. The light shutter 224 may be positioned in relation to the display surface 214 such that ambient light that passes through a particular portion of the light shutter 224 reaches a corresponding portion of the display surface 214 and is transmitted through the display surface 214 to a user's eye. While the light shutter is depicted in FIG. 1 as being positioned in a coaxial manner with respect to the display surface 214, it should be appreciated that any configuration that allows the light shutter to modulate the amount of ambient light reaching the display surface 214 is suitable.

In certain example embodiments, the computer processor may control one or more shutter elements to at least partially restrict the amount of ambient light that passes through corresponding portions of the light shutter 224 and that reaches corresponding portions of the display surface 214 at which at least a portion of a computer-generated image 220 is displayed. The computer processor may also control one or more other shutter elements to allow the ambient light to pass through corresponding portions of the light shutter 224 and reach corresponding portions of the display surface 214 such that the ambient light is transmitted through those portions of the display surface 214 to the user's eye. Further, as previously noted, the computer processor may also selectively control one or more shutter elements to at least partially restrict the amount of ambient light that passes through the light shutter 224 and that reaches one or more portions of the display surface 214 at which the computer-generated image 220 is not being displayed, but which are adjacent to an area of the display surface 214 at which the computer-generated image 220 is being displayed. In certain example embodiments, the one or more portions of the display surface 214 that are not displaying the computer-generated image 220 and through which ambient light transmission is restricted may substantially surround or encompass the area of the display surface 214 that is displaying the image 220 so as to produce a local dimming effect that improves contrast between the image 220 and the ambient environment.

Further, in certain example embodiments, an ambient light sensor 226, image sensor (e.g., camera), or the like may be provided as part of the system 202. The sensor 226 may detect an intensity of ambient light passing through various portions of the light shutter 224 and/or the display surface 214. The computer processor of the system 202 may programmatically control the shutter elements of the light shutter 224 based on sensor data that indicates ambient light intensity to modulate the amount of ambient light that passes through the light shutter 224 and that reaches the display surface 214. For example, the computer processor may determine that ambient light of a particularly high intensity (e.g., intensity above a threshold value) is being transmitted through a particular portion of the display surface 214, and may control one or more shutter elements to restrict the amount of ambient light that passes through a portion of the light shutter 224 that corresponds to the particular portion of the display surface 214. In this manner, particularly high intensities of ambient light may be diminished, thereby improving visibility of the computer-generated image and the overall user experience.

FIGS. 3A-3B depict illustrative light shutter elements in accordance with one or more example embodiments of the disclosure. FIG. 3A depicts an example embodiment in which each shutter element 304A of a light shutter may modulate the amount of ambient light that passes through a single corresponding pixel 302A. FIG. 3B depicts an example embodiment in which a shutter element 304B of the light shutter may modulate the amount of ambient light that passes through multiple pixels 302B. In still other example embodiments, multiple shutter elements may collectively modulate an amount of ambient light that passes through a single corresponding pixel (see FIG. 4C). While the light shutters depicted in FIGS. 3A-3B are shown as having a pixelated structure in which the pixels are arranged in an array configuration, other pixel configurations are also within the scope of this disclosure.

Figure 4A:
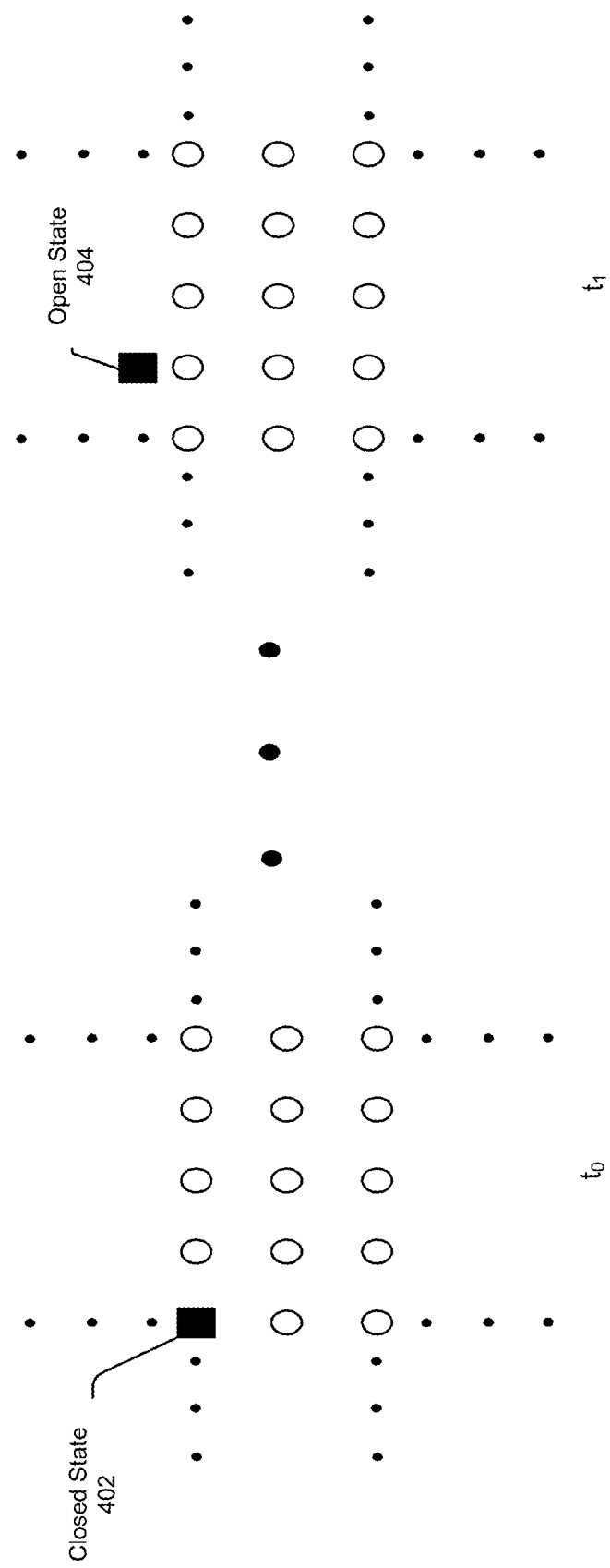

FIGS. 4A-4D depict illustrative mechanisms for generating grayscale effects in accordance with one or more example embodiments of the disclosure. As previously described, in those example embodiments in which the light shutter includes shutter elements that transition between closed states in which ambient light is substantially blocked (thereby producing black pixels) and open states in which ambient light is substantially allowed to pass through (thereby producing white pixels), a grayscale effect may be produced in various ways. For example, as shown in FIG. 4A, a grayscale effect may be achieved using a time division multiplexing technique in which one or more shutter elements are transitioned between the closed state 402 and the open state 404 at one or more time intervals. For example, at time $t_o$, a given shutter element may be in the closed state 402. The shutter element may remain in the closed state 402 for some period of time, and then a control signal may be received from a computer processor causing the shutter element to transition to the open state 404 at time $t_1$. The shutter element may continue to oscillate between the closed state 402 and the open state 404 at various time intervals. In certain example embodiments, the grayscale level may be modulated by controlling the amount of time that one or more shutter elements remain in the closed state 402 versus the open state 404.

Referring now to FIG. 4B, a grayscale effect may additionally or alternatively be achieved by maintaining or transitioning certain shutter elements to a closed state 406 and maintaining or transitioning certain other shutter elements to an open state 408. In this example embodiment, the pixels of the light shutter may need to be relatively smaller in size than in other example embodiments in order to achieve the grayscale effect using the approach depicted in FIG. 4B.

Referring now to FIG. 4C, yet another approach for achieving a grayscale effect may be the use of multiple shutter elements 410 to modulate light transmission through a single corresponding pixel element. A grayscale effect may be achievable by controlling the multiple shutter elements to achieve a desired partial transmittance of ambient light through the corresponding pixel.

Referring now to FIG. 4D, yet another approach for achieving a grayscale effect may be the use of variable transparency shutter elements 412 capable of modulating the amount of ambient light that is allowed to pass through. Various shutter elements having variable levels of transparency to ambient light are depicted in FIG. 4D. A level of transparency of the variable transparency shutter element 412 may be adjusted by varying an electrical condition of the shutter element 412 (e.g., an amount of voltage, current, or the like applied to the shutter element). The shutter element 412 may be capable of transitioning between a first state in which the shutter element 412 is substantially transparent to light and a second state in which the shutter element 412 is substantially opaque to light as well as any number of states having intermediate levels of transparency between the first state and the second state.

Figure 5:
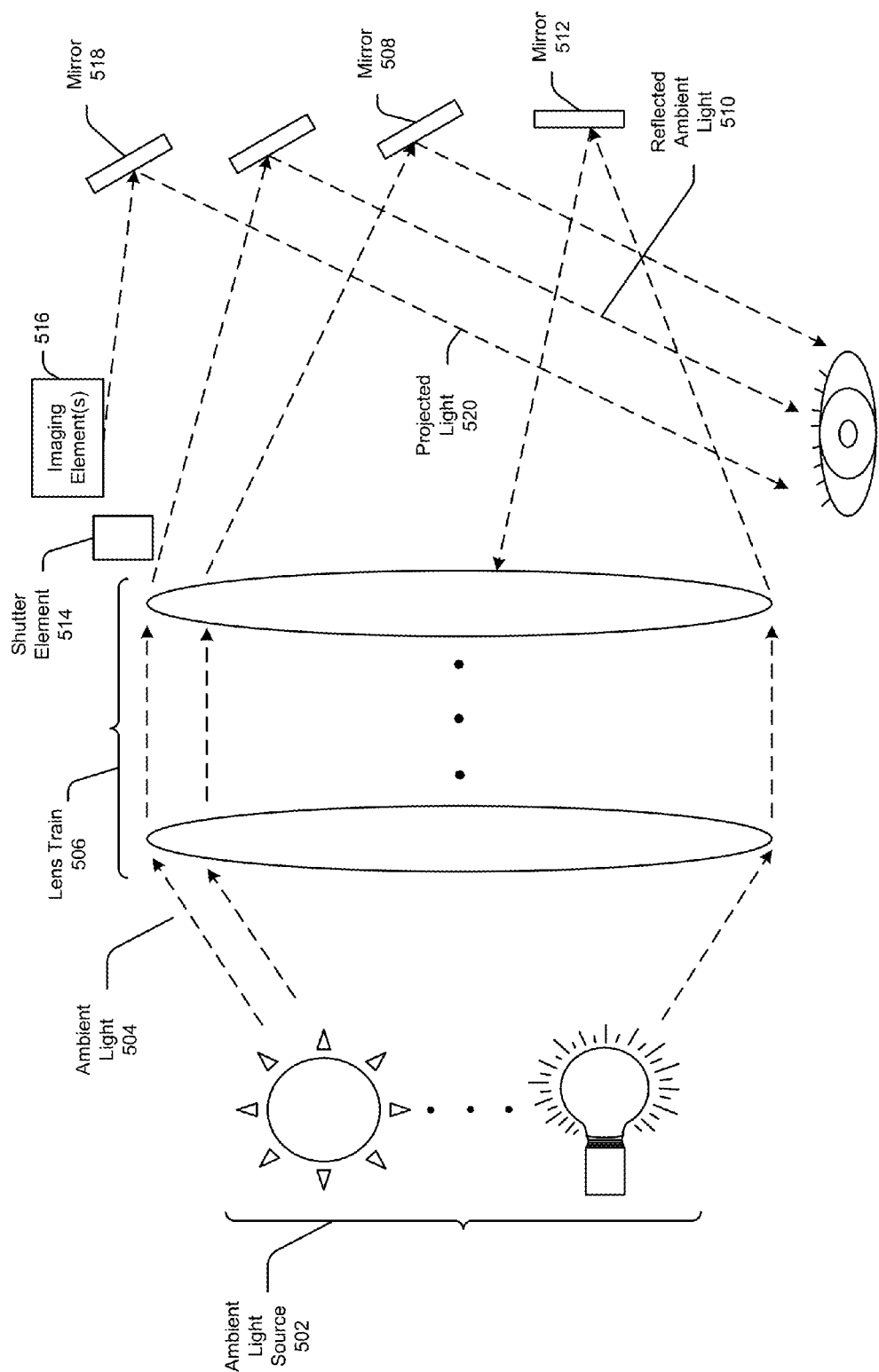
FIG. 5 is a schematic diagram of another illustrative augmented reality system in accordance with one or more example embodiments of the disclosure.

FIG. 5 is a schematic diagram of another illustrative augmented reality system in accordance with one or more example embodiments of the disclosure. The system depicted in FIG. 5 may correspond to a type of digital mirror device (DMD) in accordance with one or more example embodiments of the disclosure.

The system may include a lens train 506, one or more imaging elements 516, and a group of mirrors for reflecting ambient light 504 to a user's eye as well as projected light 520 produced by the imaging elements(s) 516. More particularly, in example embodiments of the disclosure, an ambient light source 502 may generate ambient light 504. One or more transmission characteristics (e.g., a propagation path, an amount of ambient light transmitted, an amount of ambient light reflected, etc.) may be modified by the lens train 506, which may include one or more lenses, and optionally, any number of additional optical elements. Ambient light 504 that has traveled through the lens train 506 may be reflected off one or more mirrors (e.g., mirror 508) towards the user's eye. In certain example embodiments, an orientation of any mirror may be adjusted to redirect reflected ambient light 510 towards or away from the user's eye. For example, the mirror 508 is depicted as being positioned at an angle that causes the reflected ambient light 510 to be directed towards the user's eye. Other mirror(s) (e.g., mirror 512) may be reoriented so as to reflect ambient light 510 away from the user's eye. The orientation of the mirrors may be controlled by control signals generated by a computer processor of the augmented reality system.

In addition, in certain example embodiments, a light shutter may be provided as part of the system to modulate an amount of the ambient light 504 that reaches the mirrors. The light shutter may include any of the example types of light shutters previously described. An example shutter element 514 of the light shutter is depicted in FIG. 5. The shutter element 514 may be positioned so as to modulate the amount of ambient light 504 that reaches a corresponding mirror 518. In an example embodiment, the shutter element 514 may be controlled to transition to a closed state to prevent ambient light 504 from passing through a corresponding portion of the light shutter and to thus prevent the ambient light 504 from reaching and reflecting off of the mirror 518. Imaging element(s) 516 may emit or modulate light based on image signals corresponding to a computer-generated image. The emitted or modulated light may be transmitted to one or more optical elements (not shown) that may produce projected light 520 that is reflected off of the mirror 518 towards a user's eye.

Figure 7:
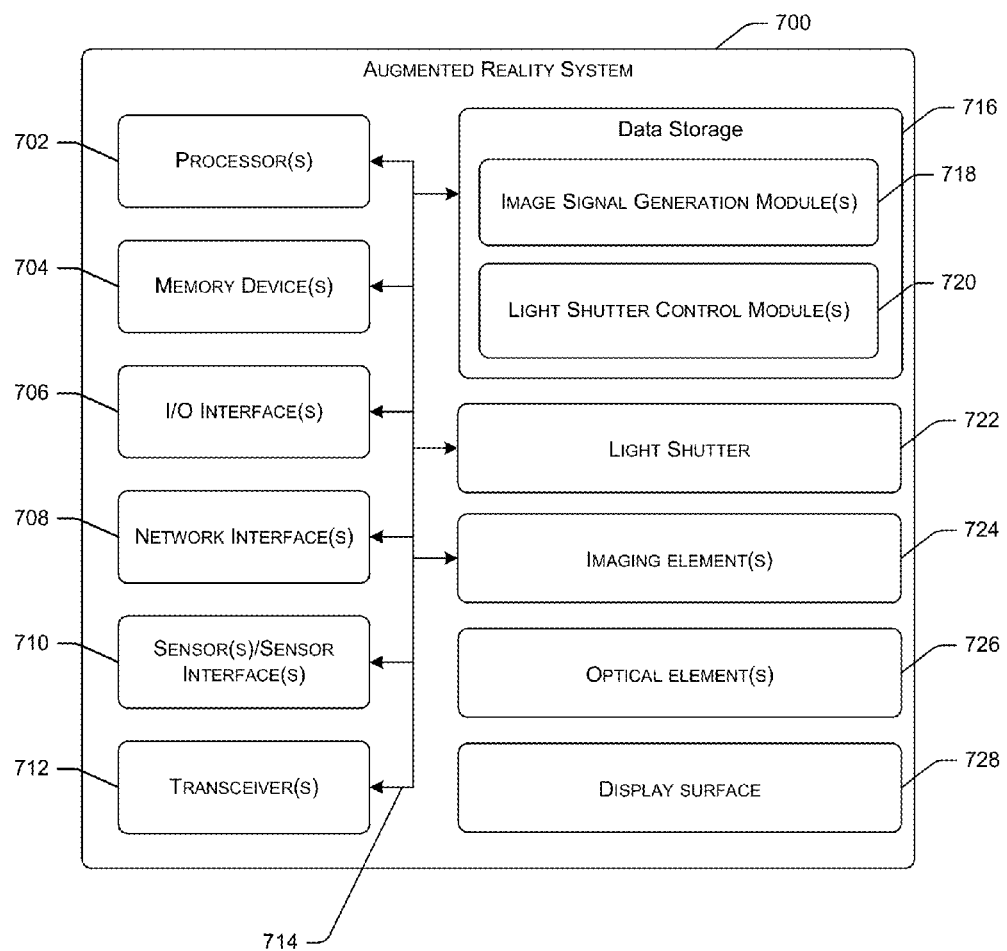
FIG. 7 is a schematic block diagram depicting example components of an illustrative augmented reality system in accordance with one or more example embodiments of the disclosure.

Referring now to FIG. 7, a schematic block diagram depicting example components of an illustrative augmented reality system 700 in accordance with one or more example embodiments of the disclosure is shown. In certain example embodiments, the system 700 may be implemented in a wearable device (e.g., glasses, goggles, helmet, etc.). In other example embodiments, the system 700 may be implemented in connection with any number of alternative applications. For example, the system 700 may be provided as part of a user appliance (e.g., a washer/dryer, a refrigerator, etc.) such that computer-generated images may be projected onto or emitted through a see-through display surface that also provides visibility into an internal portion of the appliance. As another example, the system 700 may be implemented in connection with automotive applications. For example, the display surface may be incorporated into the windshield of an automobile such that the system 700 projects light onto or emits light through the windshield. As another example, the display surface may be a window of a building. It should be appreciated that the above examples of applications in which an augmented reality system in accordance with example embodiments of the disclosure may be used are merely illustrative and not exhaustive.

In an illustrative configuration, the system 700 may include one or more processors (processor(s)) 702, one or more memory devices 704 (generically referred to herein as memory 704), one or more input/output ("I/O") interface(s) 706, one or more network interfaces 708, one or more sensors or sensor interfaces 710, one or more transceivers 712, data storage 716, a light shutter 722, one or more imaging elements 724, one or more optical elements 726, and a display surface 728. The system 700 may further include one or more buses 714 that functionally couple various components of the system 700. The system 700 may further include one or more antennas (not shown) that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 714 may include at least one of a system bus, a memory bus, an address bus, or a message bus, and may permit exchange of information (e.g., data (including computer-executable code), signaling, etc.) between various components of the system 700. The bus(es) 714 may include, without limitation, a memory bus or a memory controller, a peripheral bus, an accelerated graphics port, and so forth. The bus(es) 714 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the system 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 716 may include removable storage and/or non-removable storage including, but not limited to, magnetic storage, optical disk storage, and/or tape storage. The data storage 716 may provide non-volatile storage of computer-executable instructions and other data. The memory 704 and the data storage 716, removable and/or non-removable, are examples of computer-readable storage media (CRSM) as that term is used herein.

The data storage 716 may store computer-executable code, instructions, or the like that may be loadable into the memory 704 and executable by the processor(s) 702 to cause the processor(s) 702 to perform or initiate various operations. The data storage 716 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 716 for non-volatile storage.

More specifically, the data storage 716 may store one or more program modules such as, for example, one or more image signal generation modules 718 and one or more light shutter control module(s) 720. The data storage 716 may further store any of variety of other types of modules. Further, any program modules stored in the data storage 716 may include one or more sub-modules. Although not depicted in FIG. 7, the data storage 716 may store other computer-executable code such as, for example, one or more operating systems that may be loaded from the data storage 716 into the memory 704 and which may provide an interface between other program modules executing on the system 700 and hardware resources of the system 700. In addition, the data storage 716 may store various types of data that may be provided as input to a program module or generated as a result of execution of a program module such as, for example, sensor data indicative of ambient light intensity sensed by an ambient light sensor or the like, image data representative of computer-generated images, and so forth. Any data stored in the data storage 716 may be loaded into the memory 704 for use by the processor(s) 702 in executing computer-executable code. It should be appreciated that "data," as that term is used herein, includes computer-executable instructions, code, or the like.

Referring now to functionality supported by the various program modules depicted in FIG. 2, the image signal generation module(s) 718 may include computer-executable instructions, code, or the like that responsive to execution by one or more of the processor(s) 702 may cause processing to be performed to generate image signals (e.g., digital voltage signals, digital current signals, etc.) representative of a computer-generated image to be displayed. Digital signals generated by the image signal generation module(s) 718 may be converted by an analog-to-digital converter (ADC) to corresponding analog signals that may be supplied to electronic circuitry to control the imaging element(s) 724 to emit or modulate light in accordance with the signals. In certain example embodiments, one or more transmission characteristics of the emitted or modulated light may be altered by one or more optical element(s) 726 to generate projected light that may be projected towards and reflected off of the display surface 728 toward a user's eye.

The light shutter control module(s) 720 may include computer-executable instructions, code, or the like that responsive to execution by one or more of the processor(s) 702 may cause processing to be performed to control one or more shutter elements of a light shutter 722 to modulate the amount of ambient light that is permitted to pass through the light shutter 722 and reach the display surface 728. The light shutting control module(s) 720 may control the light shutter elements in accordance with any of the mechanisms previously described.

Referring now to other illustrative components of the system 700, the processor(s) 702 may be configured to access the memory 704 and execute computer-executable instructions loaded therein. For example, the processor(s) 702 may be configured to execute computer-executable instructions of the various program modules of the user system 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

In addition, the system 700 may include one or more input/output (I/O) interfaces 706 that may facilitate the receipt of input information by the system 700 from one or more I/O devices as well as the output of information from the system 700 to the one or more I/O devices. The I/O devices may include, for example, one or more user interface devices that facilitate interaction between a user and the system 700 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The system 700 may further include one or more network interfaces 708 via which the system 700 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The antenna(s) (not shown) may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers 712 or radio components to which or from which signals may be transmitted or received.

The transceiver(s) 712 may include any suitable radio component(s) for—in cooperation with the antenna(s)—transmitting or receiving radio frequency (RF) signals in the bandwidth and/or channels corresponding to the communications protocols utilized by the system 700 to communicate with other devices. The transceiver(s) 712 may include hardware, software, and/or firmware for modulating, transmitting, or receiving—potentially in cooperation with any of antenna(s)—communications signals according to any suitable communication protocol including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the system 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 7 as being stored in the data storage 716 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the system 700, and/or hosted on other computing device(s) accessible via one or more networks, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the system 700 may include alternate and/or additional hardware, software, or firmware components beyond those described or depicted without departing from the scope of the disclosure. More particularly, it should be appreciated that software, firmware, or hardware components depicted as forming part of the system 700 are merely illustrative and that some components may not be present or additional components may be provided in various embodiments. In addition, the system 700 may include other display components beyond those shown or described. While various illustrative program modules have been depicted and described as software modules stored in data storage 716, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 6:
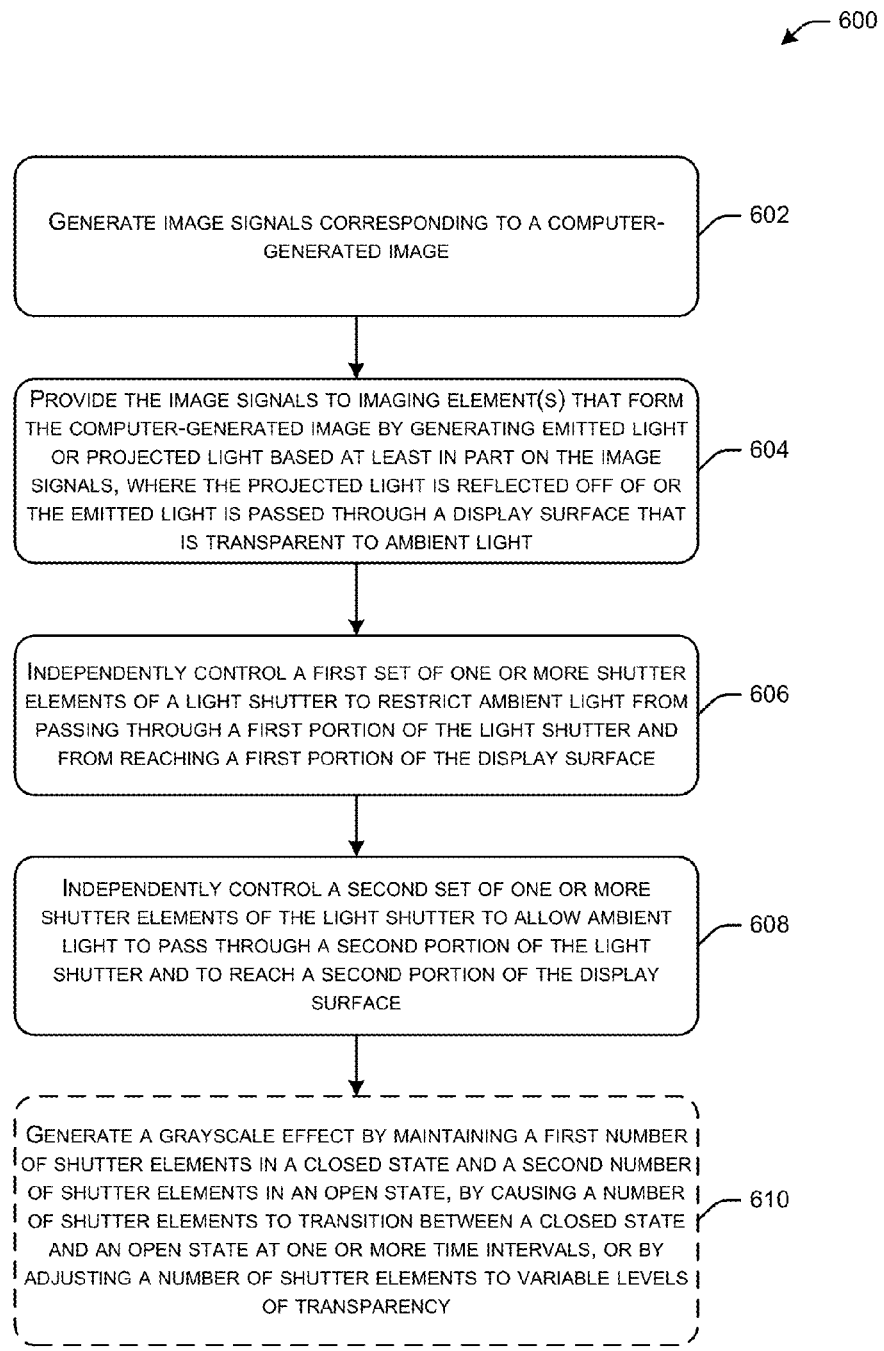
FIG. 6 is a process flow diagram of an illustrative method in accordance with one or more example embodiments of the disclosure.

FIG. 6 is a process flow diagram of an illustrative method 600 in accordance with one or more example embodiments of the disclosure.

At block 602, computer-executable instructions of the image signal generation module(s) 718 may be executed by one or more of the processor(s) 702 to generate image signals corresponding to a computer-generated image.

At block 604, computer-executable instructions of the image signal generation module(s) 718 may be executed to provide the image signals to one or more imaging elements that form the computer-generated image by generating emitted light or modulated light based at least in part on the image signals. For example, an emissive display may emit light responsive to receipt of the image signals. A non-emissive display may modulate emitted light based at least in part on the image signals to generate a modulated image. The emitted light generated by an emissive display and/or the modulated light generated by a non-emissive display may be supplied to one or more optical elements that may produce projected light. The projected light may be reflected off of or the emitted light may be passed through a display surface that is transparent to ambient light.

At block 606, computer-executable instructions of the light shutter control module(s) 720 may be executed by one or more of the processor(s) 702 to independently control a first set of one or more shutter elements of a light shutter to at least partially restrict ambient light from passing through a first portion of the light shutter and from reaching a first portion of the display surface. This may be achieved by generating a control signal that mechanically and/or electrically causes the first set of shutter elements to transition to the closed state or to a state having reduced transparency to ambient light. The first portion of the display surface may include an area of the display surface displaying a computer-generated image, and optionally, a portion of the display surface adjacent to the area displaying the image.

At block 608, computer-executable instructions of the light shutter control module(s) 720 may be executed to independently control a second set of one or more shutter elements of the light shutter to allow ambient light to pass through a second portion of the light shutter and to reach a second portion of the display surface. In this manner, suitable contrast between the computer-generated image and the ambient environment may be achieved.

Optionally, at block 610, computer-executable instructions of the light shutter control module(s) 720 may be executed to generate a grayscale effect by generating control signal(s) to maintain a first number of shutter elements in a closed state and a second number of shutter elements in an open state, by generating control signal(s) to cause a number of shutter elements to transition between the closed state and the open state at one or more time intervals, or by adjusting a number of shutter elements to variable levels of transparency.

One or more operations of the method 600 may have been described above as being performed by one or more components of the system 700, or more specifically, by one or more one or more program modules executing on such a system 700. It should be appreciated, however, that any of the operations of method 600 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 600 may be described in the context of the illustrative system 700, it should be appreciated that such operations may be implemented in connection with numerous other system configurations.

The operations described and depicted in the illustrative method of FIG. 6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. Augmented reality glasses, comprising:
a processor that generates image signals corresponding to a computer-generated image;
a see-through display surface comprising a first side and an opposing second side, wherein the display surface is at least partially transmissive to ambient light;
a projector that projects the computer-generated image on to the first side of the see-through display surface; and
a light shutter positioned adjacent to the second side of the see-through display surface that receives the ambient light, the light shutter comprising shutter elements, each shutter element being independently controllable by the computer processor to modulate an amount of the ambient light that passes through a corresponding portion of the light shutter and reaches a corresponding portion of the display surface,
the processor controlling a number of the shutter elements to cause the number of the shutter elements to block at least a portion of the ambient light from reaching an area of the display surface comprising multiple portions of the display surface, and wherein the multiple portions of the display surface comprise a first portion of the display surface displaying at least part of the computer-generated image, a second portion of the display surface displaying no part of the computer-generated image and a third display surface portion displaying no part of the computer generated image, wherein the second portion and the first portion are contiguous and the second portion and the third portion are contiguous, and wherein the shutter elements block a larger amount of light at the second portion than at the third portion.

2. The augmented reality glasses of claim 1, the processor independently controlling each shutter element of the number of shutter elements to modulate an amount of the ambient light that passes through a pixel corresponding to the shutter element.

3. The augmented reality glasses of claim 1, wherein the number of the shutter elements comprises a first set of shutter elements and a second set of shutter elements, the processor controlling the number of the shutter elements to generate a grayscale effect by at least one of:
maintaining the first set of shutter elements in a first state corresponding to a first level of transparency to the ambient light and maintaining the second set of shutter elements in a second state corresponding to a second level of transparency to the ambient light, wherein the first level of transparency is greater than the second level of transparency, or
transitioning a particular shutter element between the closed state and the open state at one or more time intervals.

4. An augmented reality system, comprising:
electronic circuitry that generates an image from image data and causes display of the image on a display surface that is at least partially transparent to ambient light; and
a light shutter comprising a plurality of shutter elements, wherein each shutter element of the plurality of shutter elements is independently controllable by the electronic circuitry to modulate an amount of the ambient light that passes through a corresponding portion of the light shutter and reaches a corresponding portion of the display surface, wherein the display surface comprises a first portion contiguous to a second portion and a third portion contiguous to the second portion, and wherein the shutter elements block a larger amount of light at the second portion than at the third portion.

5. The augmented reality system of claim 4, the electronic circuitry controlling a number of the plurality of shutter elements to cause a transition of the number of the plurality of shutter elements to a state that is at least partially opaque to the ambient light to block at least a portion of the ambient light from reaching an area of the display surface.

6. The augmented reality system of claim 5, wherein the first portion of the display surface displays at least part of the image and wherein the second portion of the display surface and the third portion of the display surface display no part of the image.

7. The augmented reality system of claim 5, wherein the area of the display surface comprises a first area of the display surface displaying the image and a second area of the display surface surrounding the first area, wherein the first area comprises the first portion of the display surface and the second area comprises the second portion of the display surface.

8. The augmented reality system of claim 4, wherein the light shutter is positioned coaxially with the display surface.

9. The augmented reality system of claim 4, wherein the electronic circuitry independently controls each shutter element of a number of the plurality of shutter elements between a first state in which a first amount of the ambient light passes through the corresponding portion of the light shutter and reaches the corresponding portion of the display surface and a second state in which a second amount of the ambient light passes through the corresponding portion of the light surface and reaches the corresponding portion of the display surface, wherein the first amount of the ambient light is greater than the second amount of the ambient light.

10. The augmented reality system of claim 9, wherein the ambient light comprises first polarized light oscillating in a first direction and second polarized light oscillating in a second direction, and wherein a particular shutter in the first state allows the first polarized light and the second polarized light to reach the corresponding portion of the display surface.

11. The augmented reality system of claim 9, wherein the number of the plurality of shutter elements comprises a first set of shutter elements and a second set of shutter elements, the electronic circuitry generating a grayscale effect by maintaining the first set of shutter elements in the first state and maintaining the second set of shutter elements in the second state.

12. The augmented reality system of claim 9, wherein the number of the plurality of shutter elements comprises a particular shutter element, the electronic circuitry generating a grayscale effect by transitioning the particular shutter element between the first state and the second state at one or more time intervals.

13. The augmented reality system of claim 4, wherein the light shutter comprises one of a monochrome matrix twisted nematic liquid crystal display (LCD), an array of electrowetting pixel elements, a shutter-mode electrophoretic display, a pixelated electrochromatic element, or a micro-electromechanical system (MEMS) shutter array.

14. The augmented reality system of claim 4, wherein the plurality of shutter elements comprises a particular shutter element that is controllable by the electronic circuitry between a plurality of states, each state having a different level of transparency to the ambient light.

15. The augmented reality system of claim 4, further comprising:
an imaging element that generates light from the image data to form the image, wherein the imaging element includes the display surface.

16. A method, comprising:
generating, by one or more computer processors, image signals corresponding to a computer-generated image;
providing, by the one or more computer processors, the image signals to an imaging element that generates light forming the computer-generated image, wherein the light is reflected off of or emitted through a display surface that is transparent to ambient light;
independently controlling, by the one or more computer processors, a first shutter element of a light shutter to block a first portion of the ambient light from passing through a first portion of the light shutter and reaching a first portion of the display surface that is displaying at least a portion of the computer-generated image; and
independently controlling, by the one or more computer processors, a second shutter element of the light shutter to allow a second portion of the ambient light to pass through a second portion of the light shutter and reach a second portion of the display surface;
independently controlling, by the one or more computer processors, a third shutter element of the light shutter to allow a third portion of the ambient light to pass through a third portion of the light shutter and reach a third portion of the display surface, wherein the second portion and the first portion are contiguous and the second portion and the third portion are contiguous, and wherein the first, second and third shutter elements block a larger amount of light at the second portion of the display surface than at the third portion of the display surface.

17. The method of claim 16, wherein independently controlling the first shutter element comprises causing the first shutter element to transition to a first state that reduces transparency of the first shutter element to the ambient light, and wherein independently controlling the second shutter element comprises causing the second shutter element to transition to a second state the increases transparency of the second shutter element to the ambient light.

18. The method of claim 17, further comprising:
generating, by the one or more computer processors, a grayscale effect by maintaining the first shutter element in the first state and maintaining the second shutter element in the second state for a period of time.

19. The method of claim 17, further comprising:
generating, by the one or more computer processors, a grayscale effect by transitioning the second shutter element between the second state and the first state at one or more time intervals.

20. The method of claim 16,
wherein the third portion of the display surface is not displaying any part of the computer-generated image.

* * * * *